May 20, 1969

D. P. HEARN ET AL 3,444,721

MOBILE GAS LEAK DETECTION

Filed May 2, 1963

DANIEL P. HEARN
DAVID D. STEDMAN
INVENTORS

BY *D. Carl ...*

ATTORNEY

DANIEL P. HEARN
DAVID D. STEDMAN
INVENTORS

BY D. Earl Richards

ATTORNEY

United States Patent Office 3,444,721
Patented May 20, 1969

---

3,444,721
MOBILE GAS LEAK DETECTION
Daniel P. Hearn and David D. Stedman, Tulsa, Okla., assignors to Century Geophysical Corporation, Tulsa, Okla., a corporation of Delaware
Filed May 2, 1963, Ser. No. 277,604
Int. Cl. G01n *31/00*
U.S. Cl. 73—23          5 Claims This invention relates to the detection of gas leaks and, more particularly, to a system of enhanced reliability in providing an indication of the location along a traverse of concentrations of hydrocarbon gases in excess of a background level.

In Patent No. 2,879,663 to Thomas, there is illustrated a mobile gas detecting apparatus which provides for the measurement of gas concentrations detected along a route followed by a search vehicle. This system is designed to detect the location of leaks along the course of a buried pipeline. Normally, a leak would be expected to appear at the surface directly above the point of escape from the pipeline. However, pipelines are often located under streets, alleys, and roadways. With such surface barriers present, the course of gas from a leak to the surface cannot be predetermined with any great reliability.

Prior art systems such as Patent No. 2,879,663 have been provided. Because of coverage of but a fairly limited area, leaks of significance have not been located. The limitation of the search area in such prior art systems has been considered necessary since dilution of a sample by large volumes of air would lower the concentration of leakage gas well into background level or below the threshold of the instrumentation employed. In increasing the resolution of the operation, two conflicting factors are encountered. The accumulation of a sample stream from a wide area along a traverse over a pipeline is desired. At the same time, dilution of the gas concentration should be minimized.

In accordance with the present invention there is provided a system having a high resolution so that a substantial area may be covered while providing reliable detection of all leaks of consequence. It is an object of the present invention, therefore, to provide for the accumulation of a sample stream from a wide path overlying a buried gas pipeline and for the detection of any leakage gas entrained in the stream.

It is a further object of the invention to provide for the detection of the hydrocarbon content of gas collected over a path of substantial width and for the quantitative and qualitative analysis of any sample detected at a leakage point.

It is a further object of the invention to provide a gas detection system which permits a gross search operation with high resolution.

In accordance with the present invention there is provided a gas analyzer and a vehicle for transporting the analyzer over a surface to be explored. A gas flow duct is provided in the vehicle with means for drawing a high volume of sample through the duct. A plurality of funnels supported adjacent to the earth's surface by the vehicle are flow-connected to the duct for supplying the duct from a path adjacent to the earth's surface of width which may extend across the vehicle. A flow channel, including a proportional flow director, extends between the duct and the analyzer for channeling a fraction of the gas flow in the duct to the analyzer. In a preferred embodiment of the invention, the analyzer is responsive to the total hydrocarbons. The analyzer output is recorded as a function of time or distance along the traverse. Means are provided for collecting a sample of gas at any point where a high concentration of fuel gas is indicated and for passing the sample through a separation column and thence to the analyzer for identifying the character of any high concentration of gas reaching the analyzer.

For a more complete understanding of the present invention and for further objects and advantages thereof, reference may now be had to the following description taken in conjunction with the accompanying drawings in which:

FIGURE 2 is a circuit diagram of a speed control unit for the compressor pump;

Figure 1:
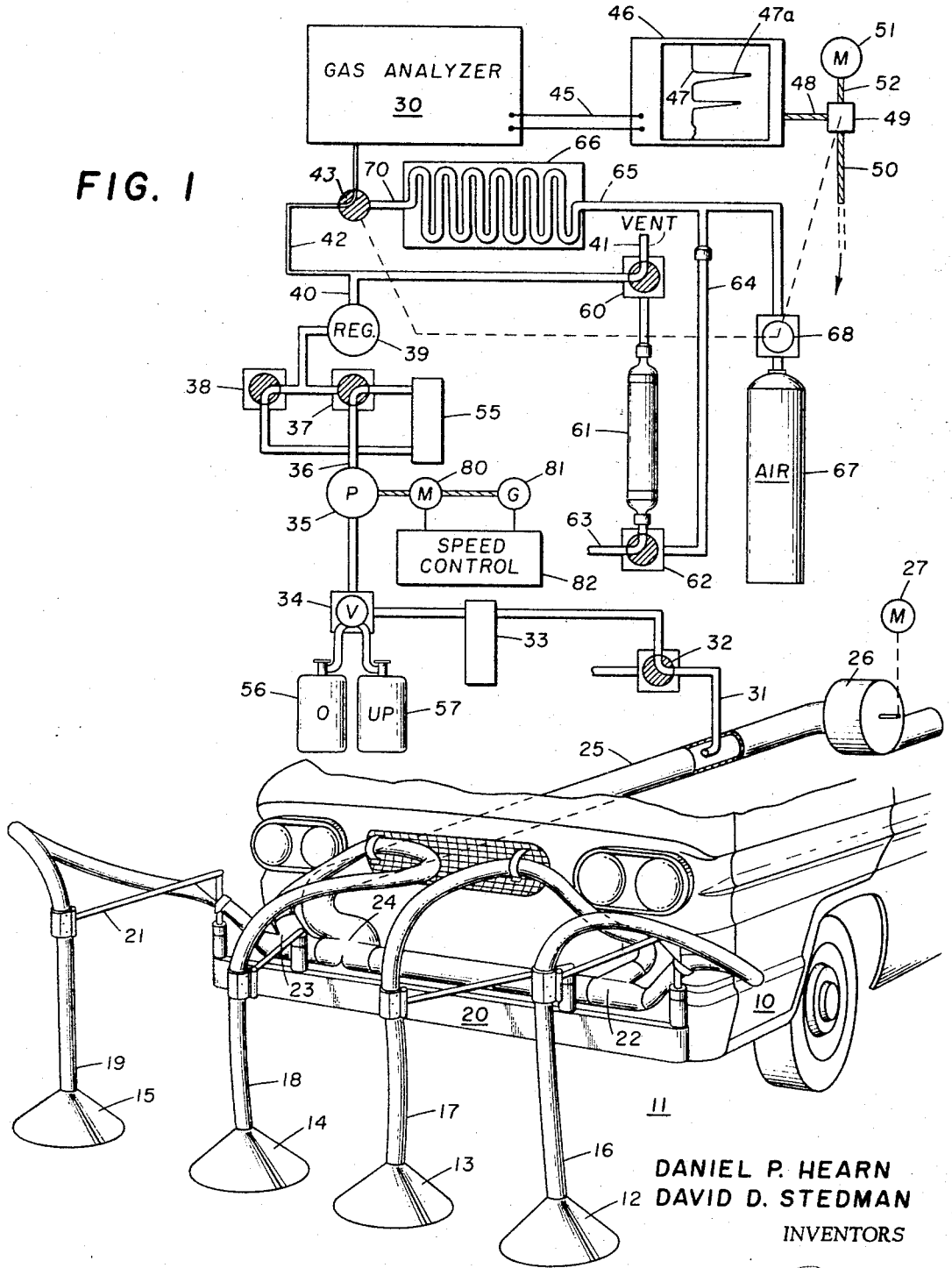
FIGURE 1 is a drawing, partially schematic, of the exploring unit of the present invention.

FIGURE 5 includes typical chromatrograms made with the system of FIGURE 1.

Referring now to FIGURE 1, a truck 10, only partially shown, is provided for transporting the exploring equipment over the earth's surface 11. A plurality of funnels 12–15 are supported on a flexible hoses 16–19 from the front bumper 20. The hoses are supported as by adjustable arms 21 so that the funnels may be variably positioned to define a pickup zone of width extending substantially the width of the truck 10 or for selective location of a funnel at each of several likely escape routes extending adjacent and parallel to the traverse of the vehicle. The hoses 16 and 17 are connected together by a T 22. The hoses 18 and 19 are connected together by a T 23. Hoses leading from T's 22 and 23 are then connected to a T 24 which leads to a large flow duct extending backward through the truck 10. The flow duct 25 includes therein a fan or blower 26 driven by a motor 27. The fan 26 is a high capacity fan which serves to draw a relatively high velocity air stream from the funnels through the duct 25.

Mounted in the truck 10 is an analyzing system which includes a gas analyzer 30. In this embodiment of the invention, the gas analyzer 30 is a total hydrocarbon analyzer. It may be of the type manufactured and sold by the Perkin-Elmer Corporation and identified as model 213B. Such analyzer includes a hydrogen flame detector which includes a high resistance circuit, the resistance of which varies in dependence upon the presence of carbon produced by combustion of hydrocarbons in a sample cell. The gas analyzer 30, in accordance with the present invention, is employed in a dual function. More particularly, serves as a continuous monitor for the total gas content swept through the duct 25 to identify the passage of relatively high concentrations of hydrocarbon gases in the gas stream. It also serves to provide a quantitative and qualitative analysis of the gas constituents in a high concentration sample.

As illustrated in FIGURE 1, a sample input line 31 extends into the duct 25 and is positioned with the opening therein in the gas stream as to divert a fractional portion of the total gas flow into the sample line. The sample line 31 is connected by way of a valve 32 to a particle filter 33. The output of the particle filter 33 is connected by way of a valve 34 to a compressor 35. The compressor 35 serves to elevate the pressure of the sample gas so that it passes by way of line 36, having valves 37 and 38 therein, to a pressure regulator 39. Gas flowing from the pressure regulator passes by way of a sample channel 40 to a vent opening 41. A fractional portion of the sample flow in line 40 is passed by way of a channel 42 and a valve 43 to the gas analyzer 30.

The analyzer 30 provides an electrical output on channel 45 which is connected to a chart recorder 46. The chart recorder 46 provides a trace 47 which indicates variations in the concentration of the hydrocarbons passing through the duct 25. The chart recorder 46 is connected by way of its dirve shaft 48 to gear shift unit 49. The shift unit 49 may be driven from either of two sources. The first source is a drive linkage 50 which is connected to the speedometer system of the vehicle 10 so that the chart on recorder 46 is driven in proportion to distance. The second is by way of a motor 51 which is connected by way of shaft 52 to the shift mechanism 49. Motor 51 is driven from a suitable electrical source so that the chart on recorder 46 may be driven in proportion to time. Thus, either a distance or a time base is available for the chart recorder 46.

It will be noted that valves 37 and 38 control flow of gas from the pump 35 through line 36 to regulator 39. As shown they direct flow through a filter 55. The filter 55 preferably is a charcoal type filter which serves to pass only the particular hydrocarbon of interest with respect to the analysis being performed. In a preferred embodiment of the invention, the filter 55 was of the type manufactured and sold by National Carbon Company, and designated as type 6S Activated Charcoal Filter. The filter employed had a total length of 6 inches and was three-quarters of an inch in diameter. The carbon filler was of the type designated further by National Carbon Company as DR No. H–110–552, grade ACC, and of 6/14 mesh charcoal filler.

A pair of containers 56 and 57 provided gases of known hydrocarbon concentration for calibration purposes. They may be selectively connected to the sample line at the input of the pump 35 by means of valve 34. Valve 34 is a three-way valve which permits the delivery of gas to the pump 35 from either the particle filter 33, the calibration gas container 56 or the calibration gas container 57. The calibration gas employed from containers 56 and 57, in general, has been found to be most convenient both in supply and in use when based upon a differential in concentration rather than absolute values. In practice, calibration gas such as nitrogen was placed in container 56 substantially methane free. Nitrogen gas from the same source was employed in container 57 but with the addition thereto of methane in an amount sufficient to raise the concentration to 100 parts methane per million parts nitrogen.

The line 40 includes a valve 60 between the juncture with the line 42 and the vent 41. The valve 60 may be positioned to bypass gas in line 40 directly to the vent 41. The valve 60, however, may be actuated to direct gas in line 40 into a sample container 61. The lower end of the container 61 is connected by way of a valve 62 to a line 63 which also leads to a vent 63. The valve 62 may also be actuated to direct flow from the container 61 through a line 64 which leads to the input flow line 65 of a chromatographic gas partitioning column 66. The partitioning column 66 may be of the type well known to those in the art. An inert gas such as air from a supply container 67 passes through a valve 68 to line 65 to serve as a carrier gas. Different hydrocarbon constituents entrained in air passing through the column 66 travel at different velocities. Because of the interaction between the hydrocarbons and material lining the column 66, there is a time separation between the various hydrocarbon constituents as they appear at the output channel 70. The valve 43, when adjusted for flow through the column, directs the output of the column to the gas analyzer. The relative proportions of the various constituents of the gas thus flowing to the gas analyzer 30 from the column 66 provide an indication of the character of the gas collected in the sample tank 61. The system thus far described permits operation in either of two models. In a first mode, sample gas is fed continuously through valve 43 to the analyzer 30. The concentration is plotted by recorder 46 as a function of distance or time. In the second mode, a sample collected in chamber 61 is passed through column 66 and the output is fed to the analyzer. In this case, the recorder 46 provides a record of concentration as a function of time.

In accordance with one mode of operation of the present invention, the valves 32, 37, 38, 43 and 60 are initially set as illustrated in FIGURE 1. Valve 34 is then actuated to introduce a sample gas from the container 56 which provides a zero reference level for the recorder chart 47. This is followed by gas from sample bottle 57 which provides an upscale calibration point for the recorder 46. Thereafter, the valve 34 is actuated to connect the output of the filter 33 to the pump 35.

The pump 35 is driven by a motor 80. The motor 80 also drives a tachometer generator 81. The output of the generator 81 is utilized to generate a control signal in the speed control unit 82 so that the speed of the motor 80 is closely regulated. If desired, a pressure sensor may be employed in the line 36 to generate a control signal for the speed control unit 82. By either such means, sample gas flowing through line 31 passes through regulator 39 to the analyzer 30 at a constant pressure and thus at a constant rate.

The vehicle 10 preferably is driven at uniform speed along the surface of the earth over a pipeline. The blower 26 draws a substantial volume of air through the duct 25. At least a portion of any leakage gas emanating from the earth's surface in the region of the funnels 12–15 is thus entrained in air passage through the duct 25. A fraction of the flow passing through duct 25 is continuously diverted through sample channel 31 to the gas analyzer.

With the recorder 46 driven from input shaft 50, the length of the chart on the recorder 46 is proportional to the distance the vehicle travels. By gathering sample air from a fairly large area as through the use of a plurality of funnels 12–15, the concentration of any hydrocarbons leaking from a buried pipeline is greatly reduced. It is necessary to use the relatively large volumes indicated in order to cover the areas most likely to be involved in a leakage path. However, in order to permit reliable coverage by use of the resultant low concentration, it is necessary to provide a sensing system which is extremely stable and free from error. In accordance with the present invention, the background level has been reduced to a low value such that a full scale deflection on the recorder 46 has been achieved with concentrations of methane as low as about 10 parts per million. This permits resolution of methane concentration down to a level of the order of one part per million. This is accomplished in accordance with the present invention with a delay between the time a given funnel passes a leakage point and the appearance of the indication thereof on the recorder 46 of approximately fourteen seconds, when operating at a speed of about 5 miles per hour.

The foregoing results are accomplished through use of the system which as a whole is devoid of operative elements which are unstable. Of significance in this regard is the use of the pump 35 carefully controlled as to pressure and flow rate thus eliminating substantial variations ordinarily encountered.

Next in the flow path is the filter 55 which cooperates with the delivery from a pump 35 to collect all hydrocarbons other than methane. The delivery of the gas issuing from the filter 55 by way of the regulator 39 provides additional smoothing of the gas flow.

Finally, the gas analyzer 30 provides substantial freedom from variable influences such as vibration, humidity, and the like, as to permit measurements at the low concentrations above noted. An ionization hydrocarbon detector is employed. As above noted, the detector may be of the type manufactured and sold by Perkin-Elmer Corporation of Norwalk, Conn., and identified as model 213B Hydrocarbon Detector, and described in detail in the Perkin-Elmer 1961 catalog of that title.

Figures 3, 4:
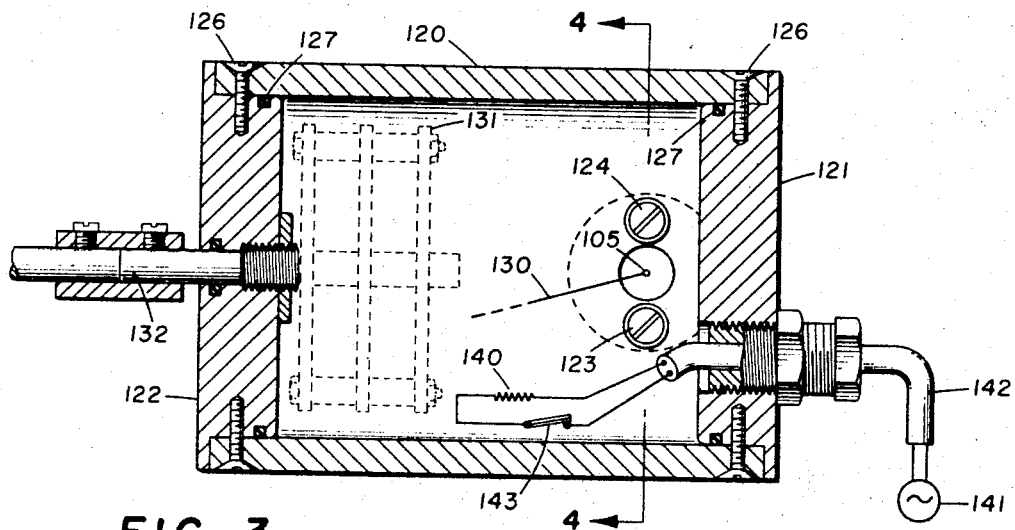
FIGURE 3 is a cross-section view of a moisture tight high impedance circuit enclosure.
FIGURE 4 is a cross-section view of a detector cell.

Since the detector structure is, in general, well known, it will be described only briefly. It includes structure of the type which has been included in FIGURES 3 and 4. The detector comprises a short metallic cylinder 100 which is closed by a plate 101. Plate 101 is secured in place by screws 102. The chamber 103 within the unit 100 is lined with an electrically insulating layer 104. An electrode 105 is supported by an insulating bushing 106 which extends through the end of the structure 100 opposite the plate 101. Sample gas, mixed with hydrogen, is fed to the chamber 103 by way of a flow channel 110. The hydrogen and sample gas flowing through channel 110 are mixed with air which flows through channel 111 coupled to fitting 112. An exhaust port 114 extends from the bottom of the chamber 103. A heater filament 115 is provided inside the chamber 103. It is mounted in a suitable insert 116 which extends through the wall of the housing 100 at right angles to the input channel 113 and output port 114. In order to initiate operation, the filament 115 is heated to an ignition temperature. Sample gas and hydrogen flowing from channel 110 are mixed with air in proportions, as known in the art, to maintain combustion within the chamber 103. The variation in concentration of hydrocarbons in the sample stream will change the electrical impedance between electrode 105 and the housing 100. The variations in such impedance are then applied to a suitable measuring and sensing system of the type disclosed in the above Perkin-Elmer Corporation publication.

The elements of the flame unit, above described, are more fully described in the catalog of Perkin-Elmer Corporation, supra. However, in order to provide for stable operation, it has been found desirable to shield the high impedance circuit associated with electrode 105. More particularly, in accordance with the present invention, the cylinder 100 is mounted onto a component housing 120. The housing 120 is a relatively short cylinder having a first end plate 121 and a second end plate 122. The cylinder 100 is mounted on a flat surface area on one side of the housing 120 and is secured thereto as by screws 123 and 124. A gasket 125 provided between the end of the cylinder 100 and the housing 120 maintains a gas-tight relationship therebetween. Two end plates 121 and 122 are secured in the cylinder 120 as by screws 126. O-rings 127 serve to maintain a gas-tight seal in the housing 120.

With this arrangement, the electrode 105 extends from cylinder 100 into housing 120. An electrical conductor 130 extends from the electrode to a network of calibrated resistances, not shown, but which are mounted on a switch structure 131, shown dotted. The switch structure is provided with a control shaft 132 so that the sensitivity of the system may be controlled by adjustment of the switch shaft. The various resistances have not been shown in FIGURE 3, but have resistance values specified for a given hydrogen flame detector by the manufacturer thereof. However, applicant provides a system for stabilizing the high impedance system of the analyzer by maintaining temperature and humidity of the high impedance elements substantially constant. Variations in the effective impedance of the system are minimized by housing the components in the chamber 120.

Reservoirs for hydrogen and compressed air for supplying the analyzer 30 are not shown. Both the hydrogen and air are regulated to a predetermined flow pressure and are maintained at a carefully controlled level further to minimize variations in the analyzer flow. The mixture in the detector cell is ignited by filament 115 of platinum. A high voltage is connected between a sensing electrode 105 within the detector cell and ground by way of a large resistor in chamber 120. Hydrogen and air burning within the cell produce an extremely low ion concentration. The detector cell resistance is therefore high with no hydrocarbons present in the stream flowing through channel 42. However, as hydrocarbons enter the detector cell through the sample inlet 42, combustion occurs generating carbon atoms and changing the cell resistance. Thus, a voltage drop across the large series resistor changes in proportion to hydrocarbon concentration in the input stream. It is this voltage change which is applied by way of channel 45, FIGURE 1, after suitable amplification, to the recorder 46.

The system is further stabilized by temperature control. A heater 140, shown diagrammatically, is connected to a suitable source 141 as by way of a cable 142. A thermostatic switch 143 is connected in series with heater 140. While the switch and heater have been shown positioned inside the housing 120, it is to be understood that they may be suitably imbedded in the wall of the housing or may be otherwise mounted as to reliably sense and control the temperature of the atmosphere inside the housing 120 with minimum variation.

The system is maintained at substantially constant temperature and since it is a closed system, the humidity is maintained substantially constant. Thus variations in impedance which otherwise would be present in the system are substantially eliminated. The only factor which is permitted any substantial effect in control of the measured impedance is the variation in hydrocarbon content of the gas entering the chamber 103 and thus the impedance sensed by the electrode 105. Since the filter 55 substantially eliminates all gas but methane from the air stream leading to the analyzer 30, the changes in current between the flame jet and the electrode are directly proportional to the concentration of methane in the system.

An ionized hydrocarbon detector of the hydrogen flame type is preferred because of the substantial insensitivity to vibration. Variations due to temperature changes and humidity are eliminated by the shielding of the high impedance components of the system. Thus there is provided such a measure of control over the sample gas that extremely high resulution can be obtained with trace concentrations of methane. This permits the sweeping of a substantial search area while at the same time providing positive identification of the presence of methane.

A relatively wide path of search is necessary in order to avoid missing leaks in the areas ordinarily to be covered in search operations. The four funnels slightly spaced one from another across the front of the search unit were found to be far more reliable than a single small sweep pickup. Extensive coverage of critical points along a pipeline route is necessary to avoid missing leaks. While four separate funnels 12–15 have been shown in FIGURE 1, is it to be understood that a single pickup scoop extending over a substantially broad path such as covered by funnels 12–15 may be employed. In such case, proportioning control in the flow path therein is desirable in order to assure sampling of the air in uniform amounts across the entire width of the scoop. Where separate funnels, shown in FIGURE 1, are used, it has been found desirable to utilize the variable positioning support means such as the arm 21 in order to accommodate various conditions. Where the pipeline lies under a paved street, for example, escaping gas from a leak probably would be encountered at the curb line. The funnels 12–15 should be positioned beyond the curb line or immediately above the edge of a curb to sample the most likely point of escape of leakage gas.

Instability due to pressure changes in the system was reduced by the precise control provided for the motor 80 in driving pump 35. The control for motor 80, in one embodiment of the invention, was accomplished by the control system illustrated in FIGURE 2.

In this system, power is derived from the automobile battery 150. Closure of switch 151 energizes a relay 152 to close a circuit from battery 150 to the motors 153 and 154 which may correspond with motors 27 and 51 of FIGURE 1.

Closure of switch 156 energizes a relay 157 to close a switch leading to the speed control system for the motor 80. A control section 160 is responsive to the voltage generated by the generator 81 under drive of motor 80. The control signal from the section 160 is then applied to a driver section 161 which drives an automatic drive control section 162. The automatic drive control section 162 controls a power switch section 163. The flow of current from battery 150 through the power transistors 170, 171, 172, and 173 is thus provided. The motor 80 is excited in such manner as to maintain its speed at a constant level. Transistors 175, 176, and 177 are included in a feedback loop leading to the driver section 161. The foregoing circuit arrangements have been shown in order to provide a general understanding of the manner in which the control is effected on motor 80. For a detailed operation of this circuit, reference may be had to Germanium Application Report, Texas Instruments Incorporated, Dallas, Tex., March 1961, and specifically to chapter 2 in the report entitled "Transistorized Switching Control of a Variable D.C. Motor."

The filter 55 was mounted in the system for downflow of sample gas therethrough. The filter was first purged by maintaining flow of methane therethrough for about 20 seconds, following which it was flushed with chemically pure, hydrocarbon-free air, for a test interval of from 15 to 30 minutes. Prolonged flushing of the filter eliminated a gradual drift that otherwise had been encountered in operation. The filter thus treated passed only methane to the analyzer. Filtered from the sample stream were all other hydrocarbon constituents which would interfere with the analysis desired. Thus, the filter 55 reduces the effect of ethane and propane and other heavier hydrocarbons while not adversely affecting measurement of methane. Since the detector 30 is not sensitive to carbon monoxide or carbon dioxide, an activated charcoal filter 55 need only remove heavy hydrocarbons.

The filter 33 preferably is a porous stainless steel filter employing a mat of stainless steel fibers. It permits removal of entrained solids in the sample stream in line 31. Filter 33, by removing particles, provides protection from contamination of the system.

The foregoing has dealt with operations in which a continuous run is made along a traverse. In a second mode of operation and at a location where the hydrocarbon concentration appears to be substantially elevated as upon the recording of a pulse such as a peak 47a, the vehicle 10 may be stopped while gas continues to be drawn through the duct 25. Valves 37 and 38 are adjusted to bypass filter 55. A sample of the high concentration gas such as indicated by peak 47a is stored in the container 61. This is done by first adjusting valve 60 for flow of the sample gas through channel 40 through the tank 61. After the tank 61 is initially purged, the valve 62 is closed so that the tank 61 is filled to the pressure controlled by the regulator 39. At this point the valve 60 is closed. The recorder drive is then changed by shifting the gear unit 49 to the motor 51 so that the length of the chart is proportional to time. Valve 62 is then opened to permit flow from tank 61 through channel 64. At the same time air is released from the tank 67 by opening valve 68. Valve 43 is also adjusted to permit flow of gas from tank 61 along with the carrier gas from container 67 through the column 66. The hydrocarbon constituents of the sample gas are then partitioned and delivered from the column 66 spaced in time.

FIGURE 5 includes a series of chromatograms of various gases. The graph of FIGURE 5A is a chromatogram of a city fuel gas. The graph of FIGURE 5B is a chromatogram of gas as produced from an oil well.

In the graph of FIGURE 5A, it will be noted that the methane peak is very high compared to the ethane peak. It is the ratio between these two peaks which provides a key to the presence of city fuel gas. This can be readily distinguished over other gases such as naturally produced gas represented by the chromatogram of FIGURE 5B.

The area of each peak on the resultant chromatogram is an indication of the amount of each given constituent in the sample from tank 61 and thus provides a quantitative and qualitative analysis of each high concentration sample. This has been found to be desirable since there are hydrocarbons other than fuel gases which may be encountered by the search array 12–15. Not only is it necessary to be able to detect concentrations of hydrocarbon gases, but also to identify the source of such gases. By providing for the two modes of operation as above described, the location of hydrocarbon concentrations can be detected. At the same time, the character of the detected hydrocarbons, and thus their probable source, can also be immediately made available.

From the foregoing, it will be appreciated that the present invention involves moving a vehicle along a surface to be explored and operating a funnel search array near the earth's surface at selected points. A large duct including a suction fan is provided for drawing gas from the funnels. Flow paths, preferably tortuous, interconnect the funnels and the large duct to assure substantial mixing of the gas components drawn from several different funels. A sample conduit has an orifice in the large duct means for diverting a fraction of the flow therefrom. Means including a high impedance hydrogen flame detector cell is connected to the sample conduit by means of a pressurizing pump, a gas pressure regulator, and a filter to deliver to the cell at uniform flow a sample stream having all hydrocarbons other than methane removed. Adjacent to the detector cell there is provided a temperature and humidity regulated zone which minimizes variations in the response of the analyzer to atmospheric conditions. A recorder is connected through such zone to the cell to provide a record of variations in total hydrocarbons reaching the cell as a function of the course of the vehicle along the earth's surface.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a gas leak detector the combination which comprises:
   (a) a vehicle for moving along a surface to be surveyed,
   (b) a gas search array supported from said vehicle near the earth's surface including a plurality of funnels interconnected by a duct network,
   (c) large duct means including a suction fan for directing gas from said network through said duct,
   (d) a small conduit having one end opening into the stream in said duct for diverting a fraction of the flow from said duct to said conduit,
   (e) a high impedance hydrogen flame detector cell,
   (f) a pressurizing pump for receiving gas from said conduit,
   (g) gas transmission means including a pressure regulator connecting said pump to said cell,
   (h) a recorder having means for receiving and driving a recording chart past a recording point, and
   (i) humidity and temperature regulated means for connecting said cell to said recorder to record as a dependent variable variations in the character of gas in said conduit.

2. In a system for detecting fuel gas leaks in an earth-covered fuel line including a vehicle for traversing a path along the earth's surface above said line and search funnel means supported by said vehicle close to the surface, the combination which comprises:
   (a) a main duct connected by tortuous flow paths to said search funnel means,
   (b) a high velocity suction fan for moving air and any entrained gas from adjacent the surface through said funnel means and said duct,
   (c) a sample line leading from said duct,
   (d) a high impedance hydrogen flame detector cell for receiving flow from said sample line, (e) a high impedance control circuit means connected to the output of said cell and including a controlled housing means for maintaining the atmosphere surrounding the high impedance means substantially uniform,
(f) a recorder, and
(g) connections leading through said housing to said recorder for applying signals thereto proportional to hydrocarbon concentrations passing through said cell independent of atmospheric variations.

3. In a system for decting fuel gas leaks in an earth-covered fuel line including search funnel means supported close to the surface to feed a duct with gas from adjacent the mouths of said funnels, the combination which comprises:
(a) a high impedance hydrogen flame detector cell for receiving fractional flow from said duct,
(b) a high impedance control circuit means connected to the output of said cell and including controlled housing means for maintaining the atmosphere surrounding the high impedance means substantially uniform,
(c) a recorder, and
(d) connections leading through said controlled housing means to said recorder for applying a signal thereto proportional to hydrocarbon concentrations passing through said cell independent of atmospheric variations.

4. In a system for detecting fuel gas leaking from an earth-covered fuel line where a search vehicle having a gas search array disposed adjacent the earth's surface is moved along a traverse for collecting a continuous flow of sample gas from adjacent said surface, the combination which comprises:
(a) a total hydrocarbon detector of the hydrogen flame type,
(b) a flow channel connected between said search array and said detector including a regulated pressurizing means for smoothing the sample gas flow to said detector,
(c) a filter in the line between said pressurizing means and said detector for removing all hydrocarbons heavier than methane,
(d) a sample bottle,
(e) means for bypassing said filter for flow from said pressurizing means directly to said bottle for collecting an unmodified sample of gas from said surface, and
(f) a gas partitioning means including a partitioning column adapted to be connected between said bottle and said detector for providing a total hydrocarbon analysis of any sample collected in said bottle.

5. In a system for detecting fuel gas leaking from an earth-covered fuel line where a search vehicle having a gas search array disposed adjacent the earth's surface is moved along a traverse for collecting a continuous flow of sample gas from adjacent said surface, the combination which comprises:
(a) a total hydrocarbon detector of the hydrogen flame type,
(b) a flow channel connected between said search array and said detector including a regulated pressurizing pump for smoothing gas sample flow to said detector,
(c) a filter in the line between said pressurizing pump and said detector for removing all hydrocarbons heavier than methane,
(d) a sample bottle,
(e) valve means for bypassing said filter for flow from said pressurizing means directly to said bottle for collecting an unmodified sample of gas from said surface, and
(f) a gas partitioning means including a partitioning column adapted to be connected between said bottle and said detector for providing a total hydrocarbon analysis of any sample collected in said bottle.

References Cited

UNITED STATES PATENTS

| 2,393,650 | 1/1946 | Metcalf | 73—23 |
| 2,972,246 | 2/1961 | Reinecke et al. | 73—23.1 |
| 3,062,037 | 11/1962 | Donner et al. | 73—23.1 |
| 3,107,517 | 10/1963 | Loyd et al. | 73—23 |
| 3,169,389 | 2/1965 | Green et al. | 73—23.1 |

OTHER REFERENCES

Wheelco Instruction Manual, "Model 10 Gas Chromatography Ionization Detection Systems," Barber-Colman Co., Rockford, Ill., pages 4, 5, 6, 17 and 19.

RICHARD C. QUEISSER, *Primary Examiner.*

I. McCLELLAND, *Assistant Examiner.*

U.S. Cl. X.R.

73—27